(12) United States Patent
Kurahashi (10) Patent No.: US 8,374,435 B2
(45) Date of Patent: Feb. 12, 2013

(54) PET IMAGE DETECTION SYSTEM AND METHOD OF CONTROLLING SAME

(75) Inventor: Hidekazu Kurahashi, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 538 days.

(21) Appl. No.: 12/613,693

(22) Filed: Nov. 6, 2009

(65) Prior Publication Data

US 2010/0119155 A1    May 13, 2010

(30) Foreign Application Priority Data

Nov. 7, 2008   (JP) ................................. 2008-286506
Sep. 3, 2009   (JP) ................................. 2009-203368

(51) Int. Cl.
*G06K 9/46* (2006.01)
(52) U.S. Cl. ...................................................... 382/190
(58) Field of Classification Search .................. None
See application file for complete search history.

(56) References Cited

U.S. PATENT DOCUMENTS

| 6,081,607 | A | 6/2000 | Mori et al. |
| 2008/0243861 | A1* | 10/2008 | Wassingbo et al. ............. 707/10 |
| 2010/0106573 | A1* | 4/2010 | Gallagher et al. ............ 705/14.4 |

FOREIGN PATENT DOCUMENTS

| JP | 10-40375 A | 2/1998 |
| JP | 2004-302644 A | 10/2004 |
| JP | 2005-339000 A | 12/2005 |

* cited by examiner

*Primary Examiner* — Nirav G Patel
(74) *Attorney, Agent, or Firm* — Birch, Stewart, Kolasch & Birch, LLP (57) ABSTRACT

The image of a human is detected from within the image of a subject and the human whose image has been detected is identified. Pet information concerning the identified human is found from a personal information table indicating the correspondence between humans and the pet information that has been associated with these humans. The image of the pet in the found pet information is found from the image of the subject. Thus, rather than all animals included in the image of the subject being found, the image of the pet associated with the particular human is detected. A pet image is thus detected in comparatively simple fashion.

6 Claims, 12 Drawing Sheets

*Fig. 2*

HUMAN INFORMATION TABLE

| FACE FEATURES | HUMAN |
|---|---|
| EYEBROWS ···; EYES ···; NOSE ···; MOUTH ···; OTHER FEATURES | MR. A |
| EYEBROWS ···; EYES ···; NOSE ···; MOUTH ···; OTHER FEATURES | MR. B |
| EYEBROWS ···; EYES ···; NOSE ···; MOUTH ···; OTHER FEATURES | MR. C |
| ⋮ | ⋮ |

*Fig. 3*

PERSONAL INFORMATION TABLE

| HUMAN | PET |
|---|---|
| MR. A | CAT |
| MR. B | DOG |
| MR. C | DOG, CAT |
| ⋮ | ⋮ |

*Fig. 4*

FACE DICTIONARY TABLE

| PET | PET BREED | FEATURE DATA (FACE DICTIONARY) |
|---|---|---|
| DOG | SHIBA | ... |
| | CHIHUAHUA | ... |
| | ⋮ | ⋮ |
| CAT | SIAMESE | ... |
| | ⋮ | ⋮ |
| ⋮ | ⋮ | ⋮ |

PET IMAGE DETECTION SYSTEM AND METHOD OF CONTROLLING SAME

BACKGROUND OF THE INVENTION

1. Field of the Invention

This invention relates to a pet image detection system and to a method of controlling this system.

2. Description of the Related Art

There are digital cameras and the like equipped with a face identification function. To achieve this, a device capable of identifying a face has been developed (see the specification of Japanese Patent Application Laid-Open No. 2004-302644).

Consideration has been given to the detection of pets in the same manner that a human face is detected. When it is attempted to raise the detection rate, however, a large amount of data is necessary and there are occasions where there is a high rate of detection error.

SUMMARY OF THE INVENTION

An object of the present invention is to so arrange it that a pet image can be detected.

According to the present invention, the foregoing object is attained by providing a image detection system comprising: a human image detecting device for detecting a human image included in the image of a subject; a human identifying device for identifying a human in the human image detected by the human image detecting device; a pet information detecting device for finding pet information, which has been associated with the human identified by the human identifying device, from a pet image database in which the pet information that has been associated with the human has been stored in correspondence with the human being; and a pet image detecting device for detecting a pet image of the pet information, which has been detected by the pet information detecting device, from the image of the subject.

The present invention also provides an operation control method suited to the pet image detection system described above. The method comprises the steps of: detecting a human image included in the image of a subject; identifying a human in the human image detected; finding pet information, which has been associated with the human identified, from a pet image database in which the pet information that has been associated with the human has been stored in correspondence with the human being; and detecting a pet image of the found pet information from the image of the subject.

In accordance with the present invention, a human image included in the image of a subject is detected and a human in the detected human image is identified. Information concerning a pet that has been associated with the human (e.g., the human keeping the pet) has been stored in a pet information database in correspondence with the human. The pet information that has been associated with the identified human is found from the pet information database and the pet image in the pet information found is detected from within the image of the subject. In a case where the image of a human and the image of an animal appear together in the image of a subject, it is highly likely that the image of the animal is the image of the pet that has been associated with this human. If the human in the image of the subject is identified, therefore, the image of the pet that has been associated with the identified human is detected from within the image of the subject. Since the image of a specific pet need only be found from the image of the subject and not the images of animals, pet images can be found comparatively simply.

The pet image detecting device detects the pet image using pet dictionary data, which represents pet features, corresponding to the pet information detected by the pet information detecting device, wherein the pet dictionary data has been stored in the pet information database in correspondence with the pet or breed of the pet.

The system may further comprise a timer for starting time-keeping from start of pet image detection processing by the pet image detecting device; and a halting device for controlling the pet image detecting device, in accordance with elapse of a fixed period of time in the timer, so as to halt the pet image detection processing.

The system may further comprise an alarm device for instructing input of information in response to pet information not being found by the pet information detecting device; and a pet input device for inputting pet information in response to the instruction by the alarm device.

By way of example, the pet image detecting device detects a pet image of the pet information, which has been input from the pet information input device, from the image of the subject.

By way of example, the pet image detecting device detects a pet image of the pet information, which has been detected by the pet information detecting device, from the image of the subject, and detects an animal image other than the pet image of the pet information, which has been detected by the pet information detecting device, from the image of the subject. In this case, the system preferably further comprises a pet information storage device for storing the animal of the animal image, which has been detected by the pet image detecting device, as pet information in correspondence with the human identified by the human identifying device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described with reference to the drawings.

Figure 1:
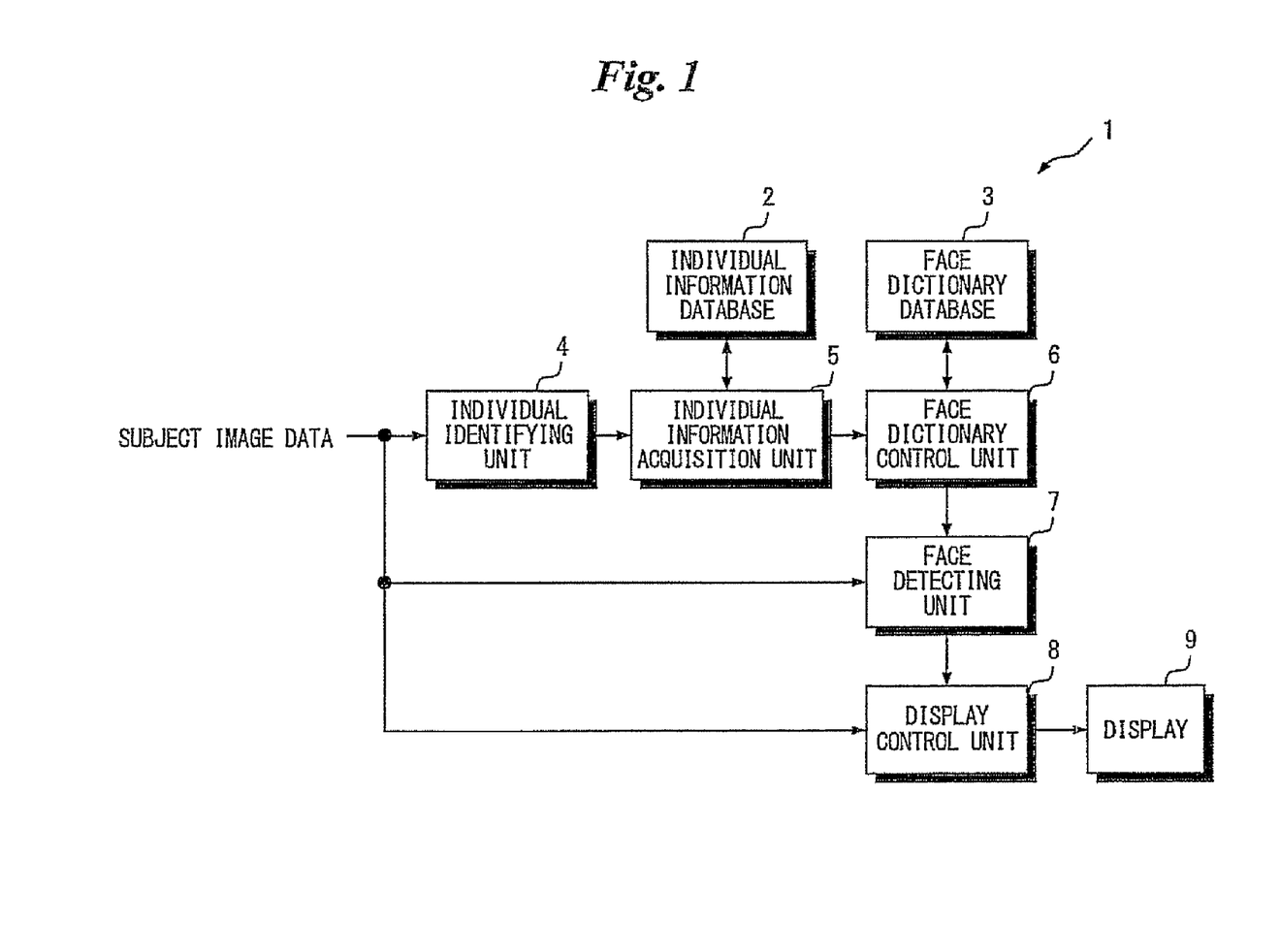
FIG. 1 is a block diagram illustrating the electrical configuration of a pet image detection system according to a first embodiment of the present invention.

FIG. 1 is a block diagram illustrating the electrical configuration of a pet image detection system 1 according to a first embodiment of the present invention.

Subject image data that has been input to the communication system 1 is input to an individual identifying unit 4, a face detecting unit 7 and a display control unit 8. The individual identifying unit 4 includes a face image detector (not shown) and a memory (not shown) in which a human information table has been stored. The individual identifying unit 4 detects the face image of a human (or the human image itself) from within the image of the subject represented by the subject image data. When the face image is detected, the human in the human image included in the image of the subject is identified from the detected face image utilizing the human information table.

Figure 2:
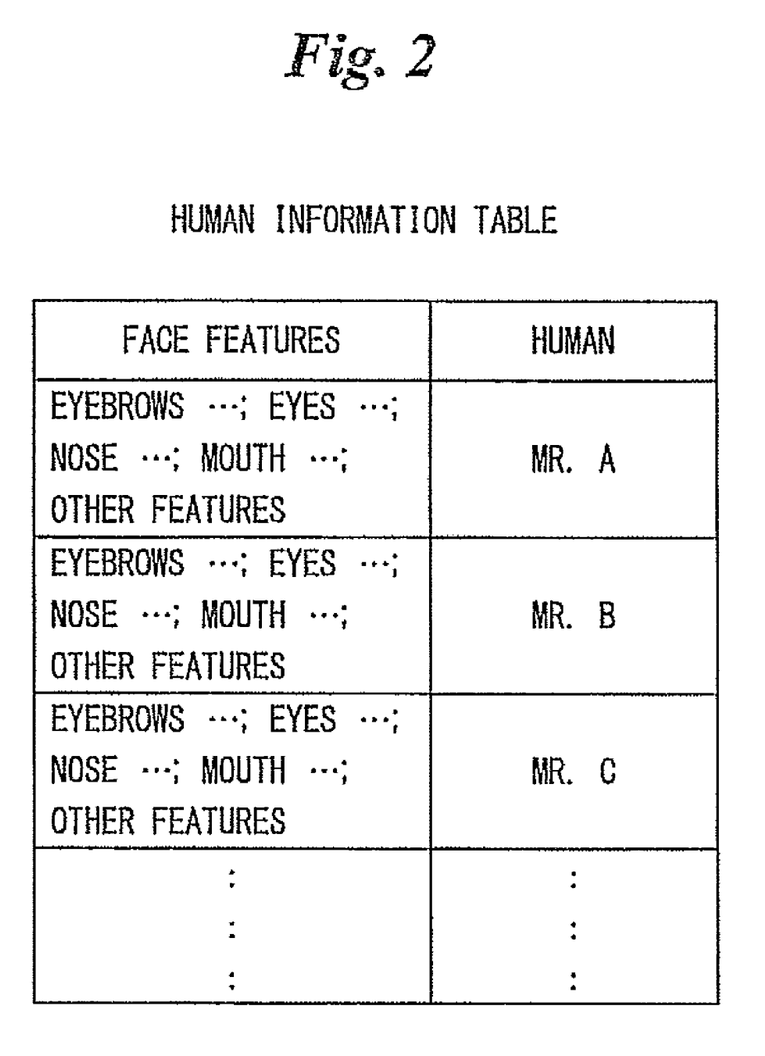
FIG. 2 is an example of a human information table.

FIG. 2 is an example of a human information table that has been stored in the individual identifying unit 4.

The human information table is for identifying, from a face image that has been detected, the human having the face of the face image. Stored in the table in correspondence with eyebrows, eyes, noses, mouths and other facial features are the names of the humans having these facial features. Thus a human having the face of a detected face image is identified based upon features of the face that can be determined from the detected face image.

With reference again to FIG. 1, when a human included in the image of a subject is identified in the individual identifying unit 4, data representing the name of the identified human is input to a personal information acquisition unit 5. A personal information table has been stored in a personal information database 2.

Figure 3:
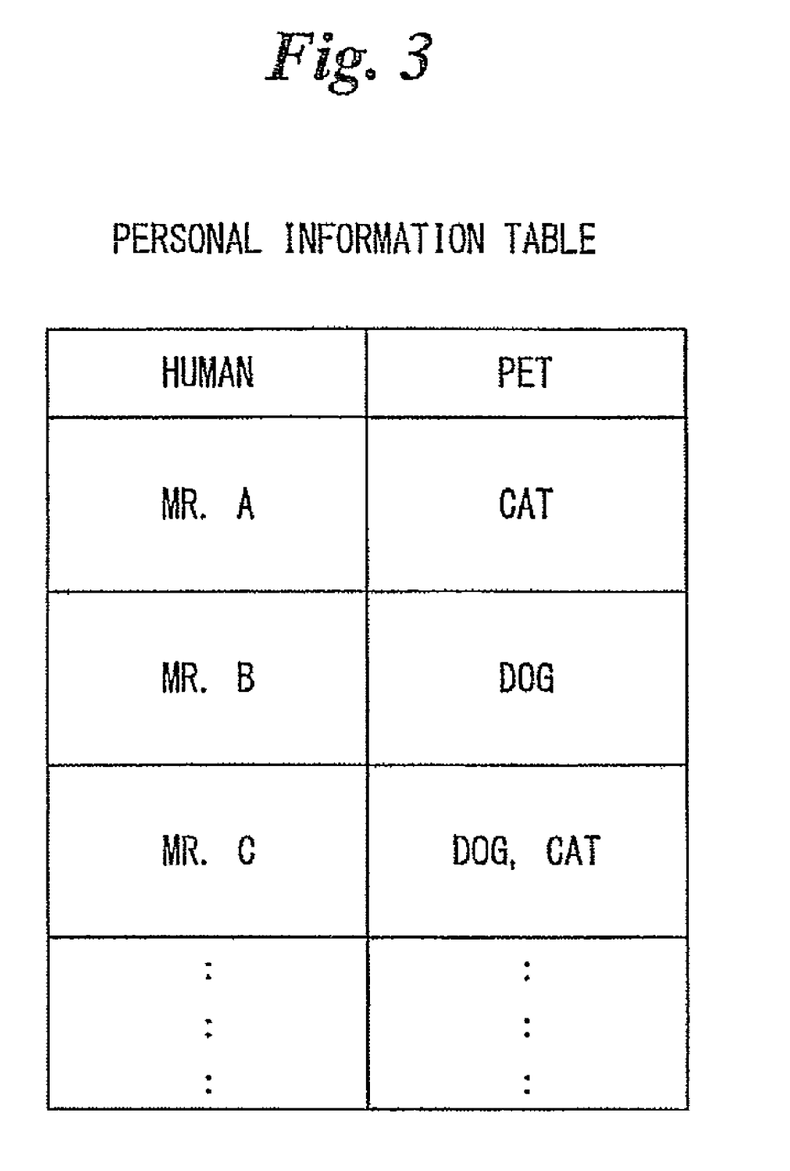
FIG. 3 is an example of a personal information table.

FIG. 3 is an example of the personal information table.

Stored in the personal information table in correspondence with humans is pet information that has been associated with these humans. (For example, the pet information is information about the pets being kept by these humans but the pets need not necessarily be kept by these humans. The pet information may be information about pets kept by other humans such as family members of these humans.) By way of example, it will be understood that Mr. A has been associated with a cat as a pet, Mr. B has been associated with a dog as a pet and Mr. C has been associated with a dog and a cat as pets. If the human can be determined, then the pet that has been associated with this human can be ascertained by referring to the personal information table.

In the example shown in FIG. 3, the pets associated with the humans have been stored in correspondence with the humans, but it may be so arranged that the breeds of pets may be stored in correspondence with the humans.

With reference again to FIG. 1, when data representing the name of a human that has been identified in the individual identifying unit 4 is input to the personal information acquisition unit 5, the pet information that has been associated with this human represented by the data is read from the personal information database 2. The pet information read is input from the personal information acquisition unit 5 to a face dictionary control unit 6.

Figure 4:
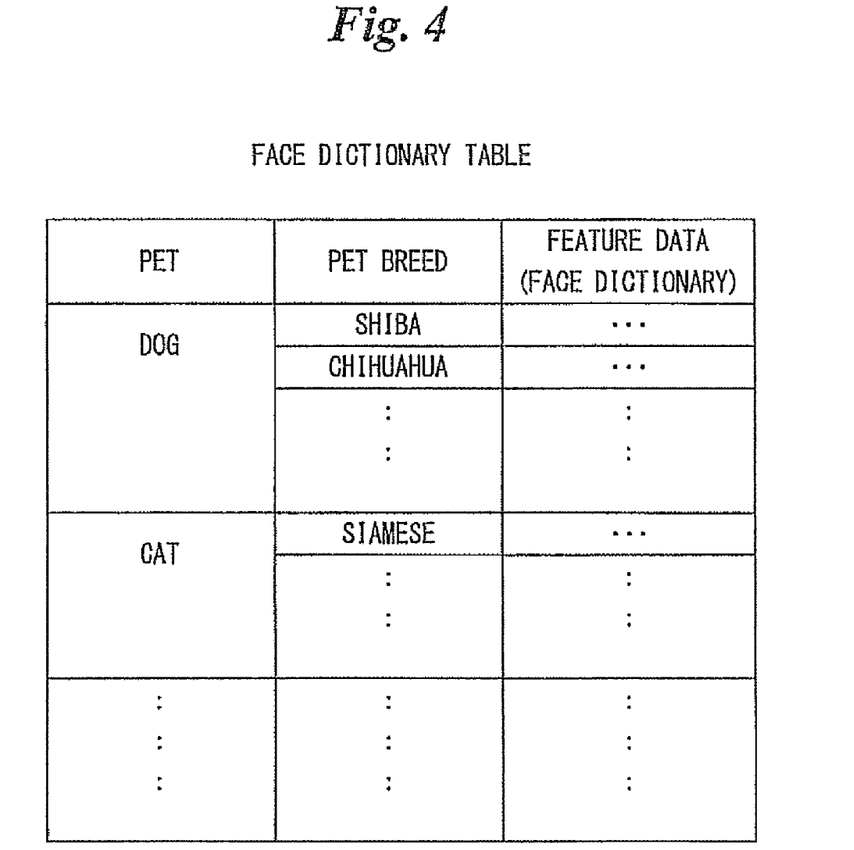
FIG. 4 is an example of a face dictionary table.

The face dictionary table has been stored in a face dictionary database 3.

FIG. 4 is an example of the face dictionary table.

Feature data (a face dictionary) has been stored in the face dictionary table for every pet and pet breed. If the pet name or pet breed is known, then the feature data necessary in order to detect the pet image of the pet or pet breed can be ascertained. Thus, the pet image of a specific pet or specific pet breed can be detected using the feature data.

With reference again to FIG. 1, a face detecting unit 7 is controlled by the face dictionary control unit 6, using the feature data corresponding to the pet information that has been input to the face dictionary control unit 6, in such a manner that the face image of the pet is detected from within the image of the subject. Data indicating the position of the face image of the detected pet is applied to a display control unit 8. The image of the subject is displayed on the display screen of a display unit 9 by the display control unit 8 in such a manner that a border is displayed around the face image of the detected pet.

Figure 5:
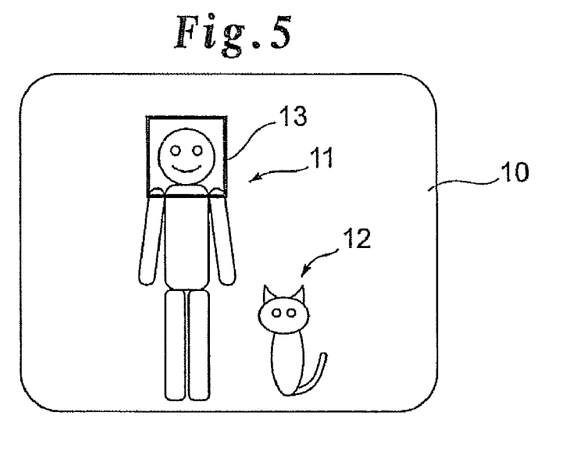
FIGS. 5 to 7 are examples of subject images.
Figure 6:
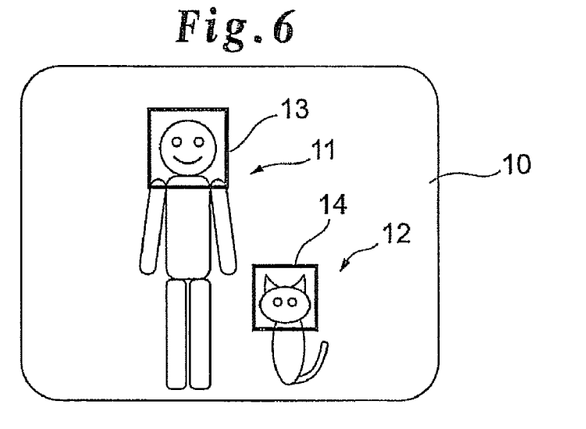
Figure 7:
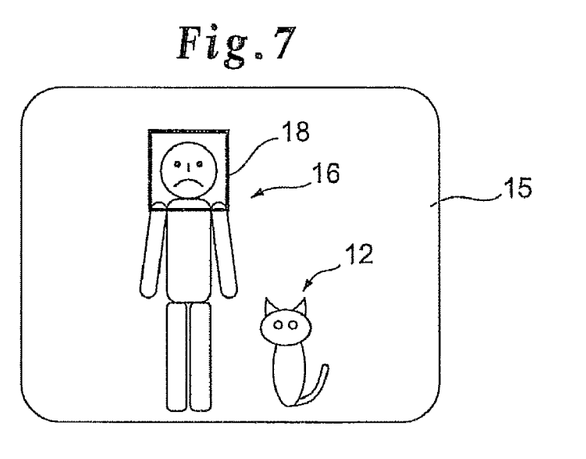

FIGS. 5 to 7 are examples of images of subjects.

A human image 11 and a pet image 12 are included in a subject image 10, as shown in FIG. 5. If the face image of the pet cannot be detected, a border 13 can be displayed around the face image portion of the human image 11 in order that only the face image of the human will be detected. For example, a brightness adjustment or the like can be made in such a manner that the face image portion inside the border 13 will have the appropriate brightness.

Similarly, as shown in FIG. 6, the human image 11 and the pet image 12 are included in the subject image 10. Here it is assumed that the human in the human image 11 has been identified from the face image portion as being Mr. A. In this embodiment, it can be determined that the pet associated with Mr. A is a cat and therefore whether the subject image 10 includes the image 12 of the cat is detected using the cat feature data. If the image 12 of the cat is included, then a border 14 is displayed around the face image portion of the cat. Since it is so arranged that the image of the cat which is the pet associated with Mr. A, and not all animals, is detected from within the subject image 10, a comparatively higher detection accuracy is achieved.

A human image 16 and the image 12 of the cat are included in a subject image 15, as illustrated in FIG. 7. Here it is assumed that the human in the human image 16 has been identified from the face image portion as being Mr. B. Since the pet associated with Mr. B is a dog, whether the subject image 15 includes the image of a dog is detected using the dog feature data (without using the cat feature data). Although the subject image 15 includes the image 12 of the cat, the image 12 of the cat is not detected because the subject image 15 does not include the image of a dog.

Figure 8:
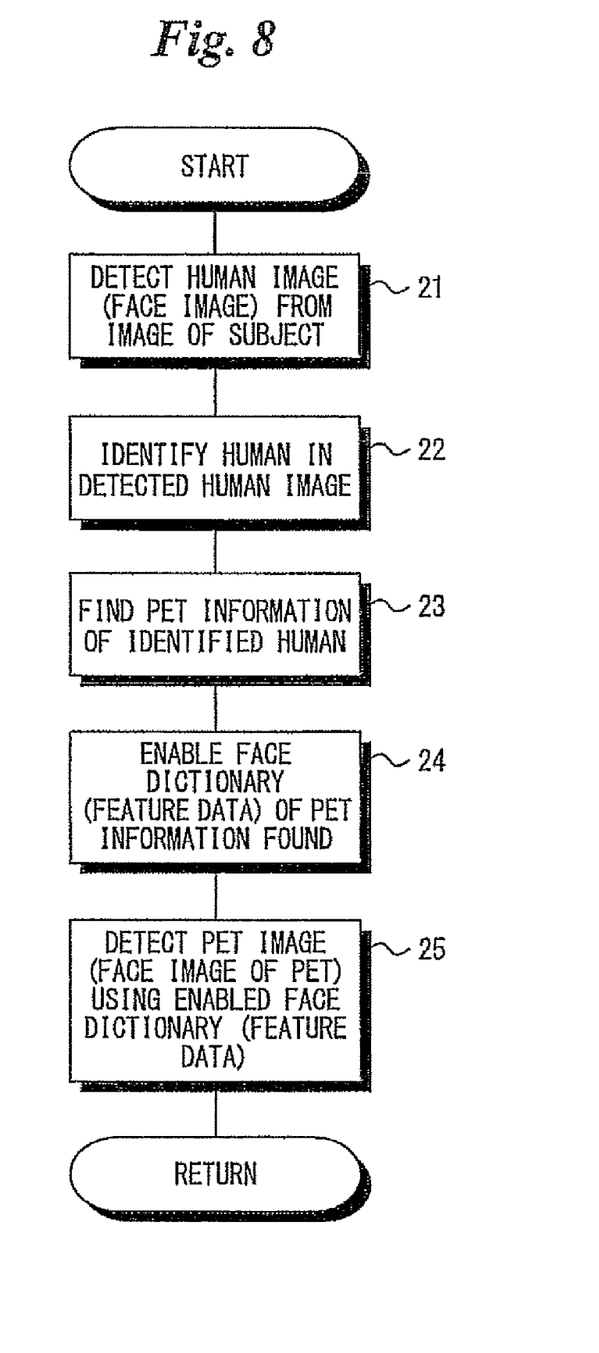
FIG. 8 is a flowchart illustrating processing executed by the pet image detection system of the first embodiment.

FIG. 8 is a flowchart illustrating processing executed by the pet detection system.

A human image (or face image) included in the image of a subject is detected from the image of the subject (step 21). If a human image is detected, the human in the detected human image is identified using the human information table (step 22). If the human is identified, then the pet information concerning the identified human is found from the personal information table (step 23). Thus the pet that has been associated with the human included in the image of the subject is ascertained.

The face dictionary database 3 is controlled so as to enable the reading of the feature data, which corresponds to the pet or pet breed in the found pet information, from the face dictionary table (i.e., so as to disable the reading of other feature data) [in other words, the face dictionary (feature data) is enabled or disabled] (step 24). The pet image (the face image of the pet) included in the image of the subject is detected using the enabled feature data (step 25).

As a result, the face image of the pet can be detected and the border 14 can be displayed around the face image portion, as shown in FIG. 6. By previously storing the feature data representing the face of the human in the face dictionary table and enabling the reading of this data, the face image of the human can also be detected and the border 13 can also be displayed around the face image portion of the human, as illustrated in FIG. 6. For that matter, since the face image portion of the human has been detected in the individual identifying unit 4, the border around the face image portion of the human can be displayed by supplying the data representing the position of the detected face image portion from the individual identifying unit 4 to the display control unit 8.

If a human image could not be detected in the image of the subject, pet image detection processing may be executed upon enabling a face dictionary of default pet information, or it may be so arranged that the pet image detection processing is executed upon enabling face dictionaries of all pet information. It is preferred that in a case where a plurality of human images have been detected from the image of the subject, the pet image detection processing is executed upon enabling the face dictionaries of the pet information concerning the pets that have been associated with the plurality of humans in the plurality of human images detected. Further, it may be so arranged that the face image detection processing is executed upon enabling a face dictionary of pet information of a pet that has been associated with a plurality of humans in common, and it may be so arranged that face image detection processing is executed upon enabling a face dictionary of pet information of a pet that has been associated with a specific human (e.g., a human at the center of the image of the subject or the human having the largest size in the image of the subject).

In a case where the pet image detection system described above is applied to digital still camera, the system may be implemented at the time of playback and, when the image of the subject is being displayed as a moving image in the imaging mode, at the time of recording. In a case where the image of the subject is being displayed as a moving image in the imaging mode, the above-described processing would be executed repeatedly during the time that the shutter-release button is being pressed. Tracking of face images and pet images can thus be achieved.

Figure 9:
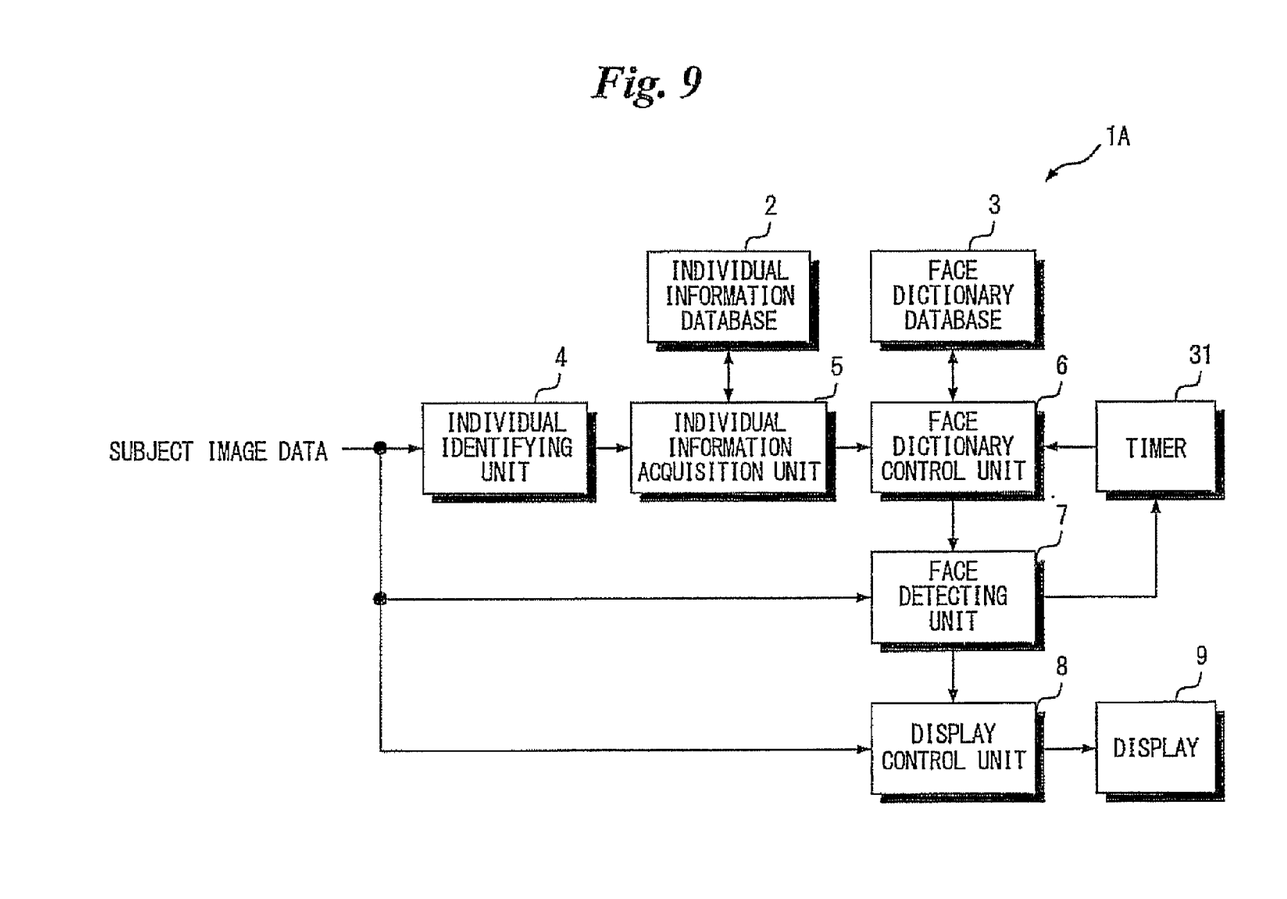
FIG. 9 is a block diagram illustrating the electrical configuration of a pet image detection system according to a second embodiment of the present invention.
Figure 10:
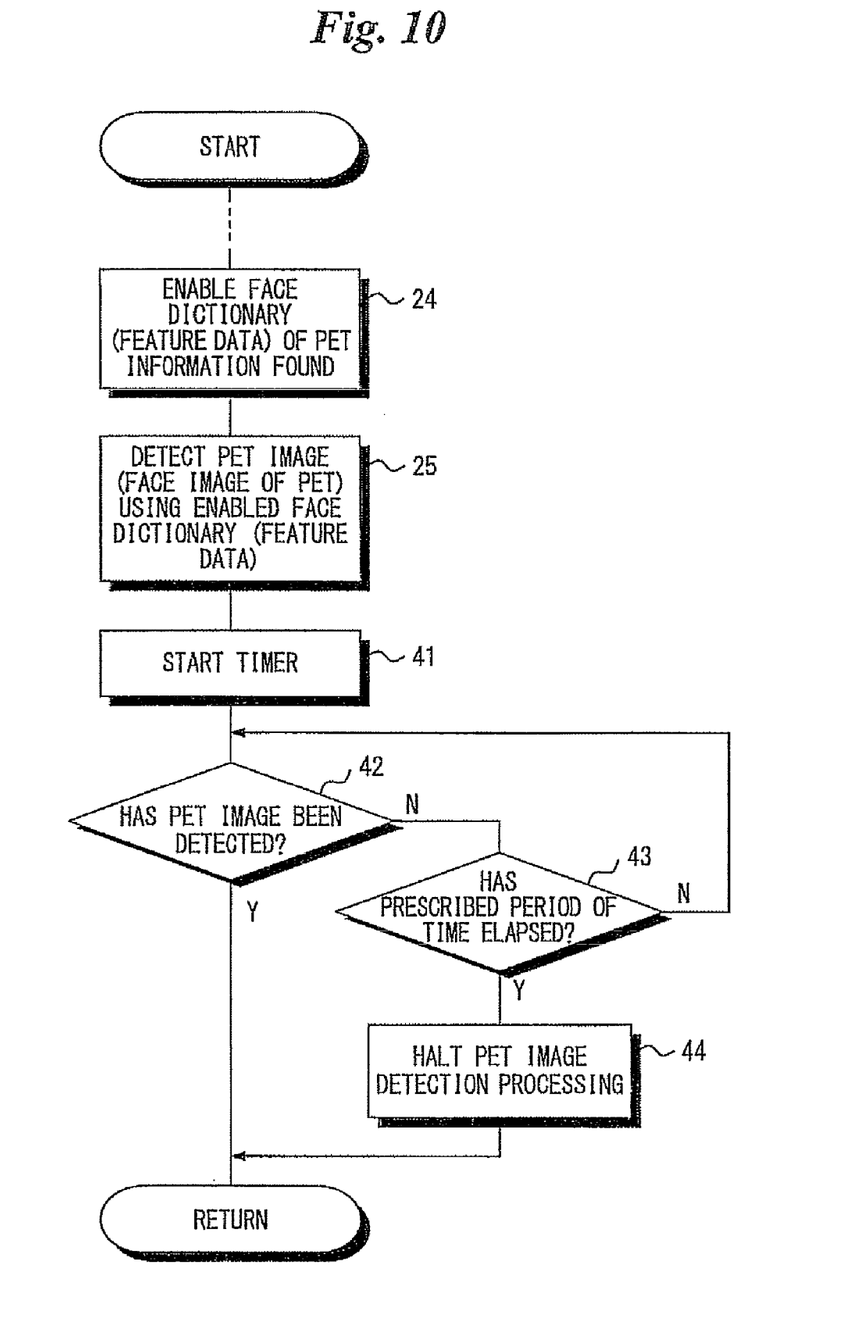
FIG. 10 is a flowchart illustrating processing executed by the pet image detection system according to the second embodiment.

FIGS. 9 and 10 illustrate a second embodiment of the present invention.

FIG. 9 is a block diagram illustrating the electrical configuration of a pet image detection system 1A according to the second embodiment.

Components in FIG. 9 identical with those shown in FIG. 1 are designated by like reference characters and need not be described again.

The pet image detection system 1A shown in FIG. 9 is provided with a timer 31. The timer 31 starts timekeeping from the start of processing for detecting a pet image in the face detecting unit 7. When a fixed period of time elapses in the timer 31, data indicating this elapse of time is supplied from the timer 31 to the face dictionary control unit 6. In response, the face dictionary control unit (halting means) 6 halts the face detection processing by the face detecting unit 7. Processing for detecting a pet image can thus be limited to the fixed time period.

FIG. 10 is a flowchart illustrating processing executed by the pet image detection system 1A. Processing steps in FIG. 10 identical with those shown in FIG. 8 are designated by like step numbers and need not be described again.

When processing for detecting a pet image is executed using an enabled face dictionary, as described above, timekeeping by the timer 31 starts (step 41). If a pet image cannot be detected ("NO" at step 42), whether a prescribed period of time has elapsed is checked (step 43). Processing for detecting a pet image is executed until the prescribed period of time elapses ("NO" at step 43). When the prescribed period of time elapses, processing for detecting a pet image is halted (step 44).

When a pet image is detected ("YES" at step 42), the processing shown in FIG. 10 ends. It goes without saying that the timer 31 is reset in response to detection of a pet image or elapse of the prescribed period of time.

Figure 11:
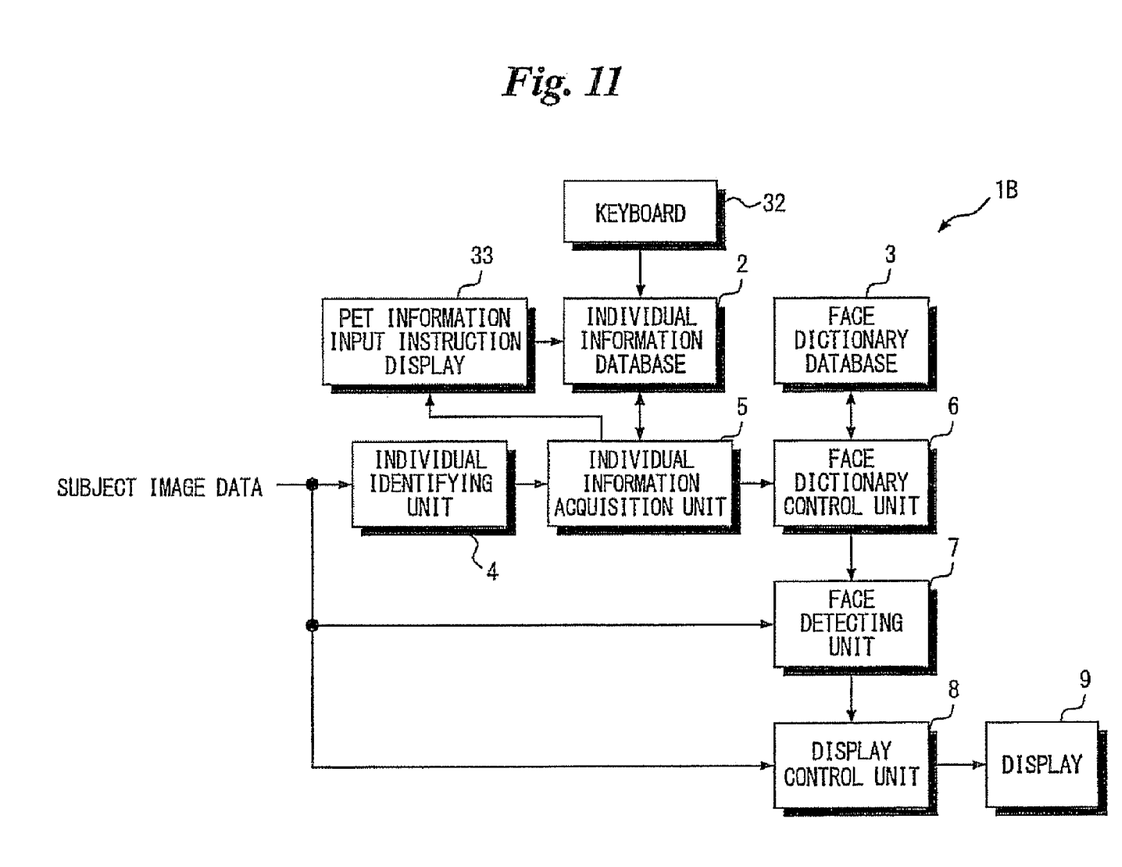
FIG. 11 is a block diagram illustrating the electrical configuration of a pet image detection system according to a third embodiment of the present invention.
Figure 12:
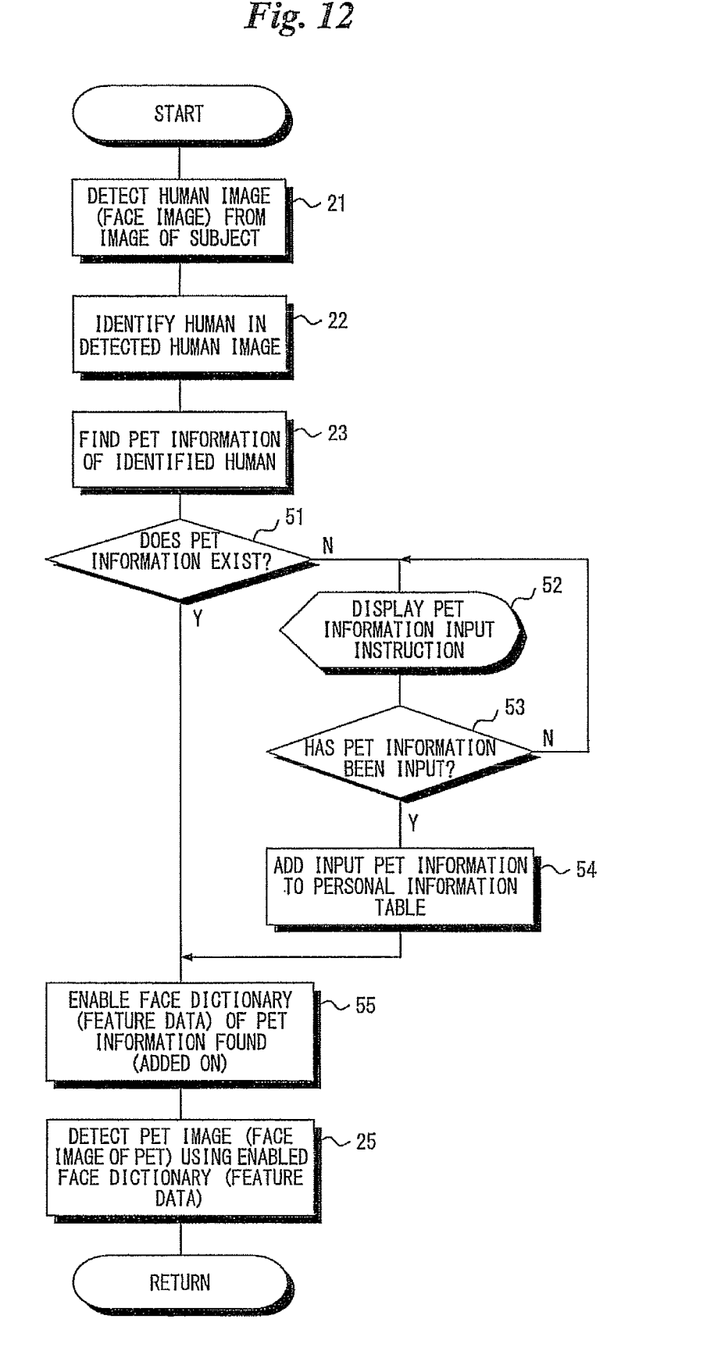
FIG. 12 is a flowchart illustrating processing executed by the pet image detection system of the third embodiment.

FIGS. 11 and 12 illustrate a third embodiment of the present invention.

FIG. 11 is a block diagram illustrating the electrical configuration of a pet image detection system 1B according to the third embodiment.

Components in FIG. 11 identical with those shown in FIG. 1 are designated by like reference characters and need not be described again.

The pet image detection system 1B shown in FIG. 11 is provided with a keyboard (pen information input means) 32 and with a display unit (alarm means) 33 for instructing the user to input pet information. In a case where pet information of the human in a human image included in the image of a subject could not be detected, a pet-information input instruction is displayed on the display unit 33 by the personal information acquisition unit 5. Viewing the input instruction, the user inputs the pet information and the name of the human from the keyboard 32. The input pet information is stored in the personal information table in correspondence with the human. Since the user can ascertain that pet information has not been input, the user is capable of inputting the pet information.

FIG. 12 is a flowchart illustrating processing executed by the pet image detection system 1B. Processing steps in FIG. 12 identical with those shown in FIG. 8 are designated by like step numbers and need not be described again.

If pet information of an identified human cannot be found ("NO" at step 51), an instruction to input pet information is displayed (step 52) in the manner described above. When the pet information is input (step 53), the pet information that has been input is added to the personal information table in correspondence with the human (step 54). Thereafter, the face dictionary of the pet information that has been added on is enabled (step 55) and processing for detecting a pet image is executed (step 25).

Figure 13:
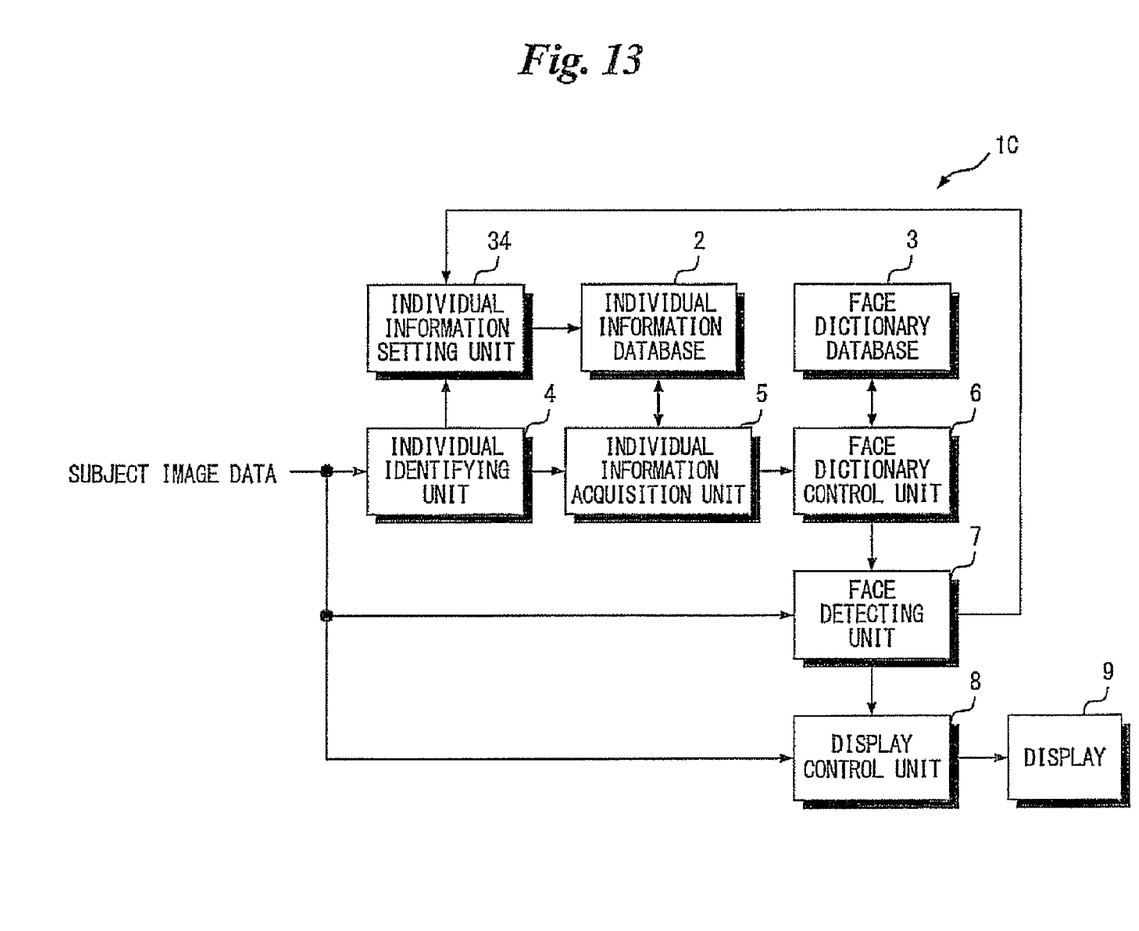
FIG. 13 is a block diagram illustrating the electrical configuration of a pet image detection system according to a fourth embodiment of the present invention.
Figure 14:
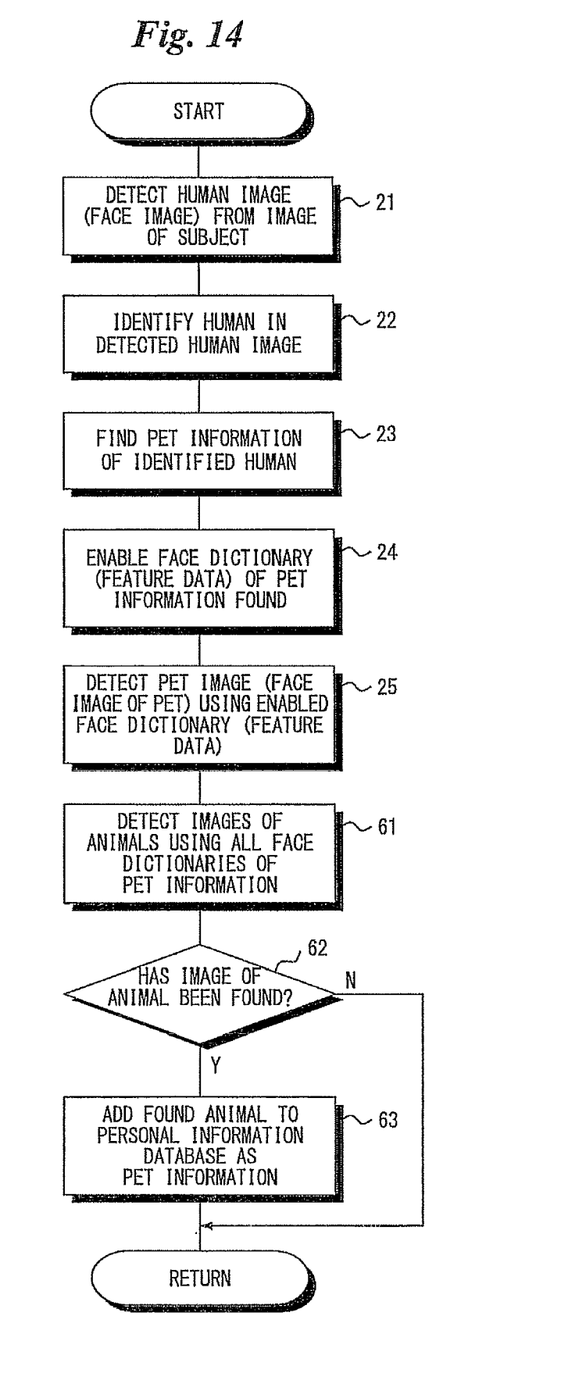
FIG. 14 is a flowchart illustrating processing executed by the pet image detection system according to the fourth embodiment.

FIGS. 13 and 14 illustrate a fourth embodiment of the present invention.

FIG. 13 is a block diagram illustrating the electrical configuration of a pet image detection system 1C according to the fourth embodiment.

Components in FIG. 13 identical with those shown in FIG. 1 are designated by like reference characters and need not be described again.

This embodiment includes a personal information setting unit 34. In the above-described embodiments, a pet that has been associated with a human identified from the image of a subject is detected from the personal information table, the face dictionary of the detected pet is enabled and the pet image is detected. That is, only the image of a pet ascertained from pet information that has been stored in the personal information table is detected from the image of the subject. In the fourth embodiment, image detection processing of all animals included in the image of the subject is executed after the image of a pet ascertained from the pet information that has been stored in the personal information table is detected.

If the images of animals other than a pet ascertained from the pet information that has been stored in the personal information table are detected, then the image data representing these detected animals is supplied from the face detecting unit 7 to the personal information setting unit 34. The detected animals are stored anew in the personal information table as pets by the personal information setting unit 34.

FIG. 14 is a flowchart illustrating processing executed by the pet image detection system 1C. Processing steps in FIG. 14 identical with those shown in FIG. 8 are designated by like step numbers and need not be described again.

When a pet image is detected using an enabled face dictionary (step 25), as described above, in this embodiment the images of animals included in the image of the subject are detected using all face dictionaries of the pet information (step 61). If the image of an animal is found ("YES" at step 62), then the found animal is stored in the personal information table as pet information (step 63).

For example, in a case where the image of Mr. B is included in the subject image 15, as shown in FIG. 7, the fact that the pet associated with Mr. B based upon the personal information table is a dog means that the image 12 of the cat is not detected even though the image 12 of the cat is included in the subject image 15. In this embodiment, however, the image 12 of the cat is detected and the cat is added on as pet information associated with Mr. B. The next time, therefore, the image of the cat and the image of the dog can both be detected.

Since the above-described processing takes a comparatively long time, it is preferred that the processing be executing when images are played back.

As many apparently widely different embodiments of the present invention can be made without departing from the spirit and scope thereof, it is to be understood that the invention is not limited to the specific embodiments thereof except as defined in the appended claims.

What is claimed is:

1. A pet information detection system comprising:
    a human image detecting device for detecting a human image included in a subject image;
    a human identifying device for identifying a human in the human image detected by said human image detecting device;
    an individual information acquisition device for pet information, which has been associated with the human identified by said human identifying device, from a personal information database in which the pet information that has been associated with the human has been stored in correspondence with the human; and
    a pet image detecting device for detecting a pet image from the subject image corresponding to the acquired pet information.

2. The system according to claim 1, wherein said pet image detecting device detects the pet image using pet dictionary data, which represents pet features, corresponding to the acquired pet information, wherein the pet dictionary data has been stored in the pet information database in correspondence with the pet or breed of the pet.

3. The system according to claim 1, further comprising a timer for starting timekeeping from start of pet image detection processing by said pet image detecting device; and
    a halting device for controlling said pet image detecting device, in accordance with elapse of a fixed period of time in said timer, so as to halt the pet image detection processing.

4. The system according to claim 1, further comprising:
    an alarm device for instructing input of information in response to pet information not being acquired by the individual information acquisition device ; and
    a pet input device for inputting pet information in response to the instruction by said alarm device;
    wherein said pet image detecting device detects a pet image from the subject image corresponding to the pet information, which has been input from said pet information input device.

5. The system according to claim 1, wherein said pet image detecting device detects a pet image from the subject image corresponding to the acquired pet information, and detects an animal image other than the pet image corresponding to the pet information; and
    said system further comprises:
    a pet information storage device for storing the animal of the animal image, which has been detected by said pet image detecting device, as pet information in correspondence with the human identified by said human identifying device.

6. A method of controlling operation of a pet image detection system, comprising the steps of:
    detecting, using a processor, a human image included in a subject image;
    identifying, using a processor, a human in the human image detected;
    finding, using a processor, pet information, which has been associated with the human identified, from a personal information database in which the pet information that has been associated with the human has been stored in correspondence with the human; and
    detecting, using a processor, a pet image from the subject image corresponding to the found pet information.

* * * * *